United States Patent
Miyake

(10) Patent No.: US 8,038,785 B2
(45) Date of Patent: Oct. 18, 2011

(54) BLACK INK COMPOSITION, INKJET-RECORDING METHOD, RECORDED MATERIAL, AND BLACK DISPERSION

(75) Inventor: Kazuhito Miyake, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 802 days.

(21) Appl. No.: 11/997,343

(22) PCT Filed: Aug. 1, 2006

(86) PCT No.: PCT/JP2006/315567
§ 371 (c)(1),
(2), (4) Date: Jan. 30, 2008

(87) PCT Pub. No.: WO2007/015573
PCT Pub. Date: Feb. 8, 2007

(65) Prior Publication Data
US 2010/0098916 A1 Apr. 22, 2010

(30) Foreign Application Priority Data
Aug. 2, 2005 (JP) .................................. 2005-224579

(51) Int. Cl.
*C09D 11/00* (2006.01)

(52) U.S. Cl. ........................................ 106/31.9; 106/403
(58) Field of Classification Search .................. 523/160, 523/161; 106/31.01–31.97, 31.9, 403; 347/100; 428/195.1; 427/256
See application file for complete search history.

(56) References Cited

U.S. PATENT DOCUMENTS

| | | | |
|---|---|---|---|
| 2003/0110978 A1* | 6/2003 | Abe et al. | 106/31.13 |
| 2004/0072923 A1* | 4/2004 | Matsunami et al. | 523/160 |

FOREIGN PATENT DOCUMENTS

| | | |
|---|---|---|
| JP | 83498 A | 1/1996 |
| JP | 1081837 A | 3/1998 |
| JP | 10120958 A | 5/1998 |
| JP | 11323223 A | 11/1999 |
| JP | 11343436 A | 12/1999 |
| JP | 2004149765 A | 5/2004 |
| WO | WO2006/033304 A1 * | 3/2006 |

OTHER PUBLICATIONS

Machine English Translation of JP 10-081837 A.*
English Abstract of WO2006/033304 (Mar. 2006).*

* cited by examiner

*Primary Examiner* — David W Wu
*Assistant Examiner* — Vu A Nguyen
(74) *Attorney, Agent, or Firm* — Sughrue Mion, PLLC

(57) ABSTRACT

A black ink composition that contains metal particles having a silver tin alloy region as its colorant.

14 Claims, No Drawings

BLACK INK COMPOSITION, INKJET-RECORDING METHOD, RECORDED MATERIAL, AND BLACK DISPERSION

TECHNICAL FIELD

The present invention relates to a black ink composition, containing metal particles having silver tin alloy regions as its colorant, that is suitable for ink-jet recording; an inkjet-recording method, a recorded material, and a black dispersion.

BACKGROUND ART

The inkjet-recording method is a printing method of obtaining a print by causing droplets of an ink composition to fly and depositing the droplets on a recording medium, such as paper. The method characteristically enables printing of a high-definition, high-quality image at high speed with a relatively inexpensive device.

Ink compositions for use in ink jet recording generally contain water as the principal component, as well as a coloring component and a moisturizer, such as glycerol, to prevent ink clogging and for other purposes. Water-soluble dyes have been widely used as the colorant for use in the inkjet-recording ink composition, because of the high chroma of colorant, the diversity of available colorants, solubility in water, and other factors.

However, dyes are often inferior in many properties, such as light resistance and water resistance, and thus, many prints printed by using a dye-based ink composition are inferior in light resistance and water resistance. As to water resistance, introduction of inkjet recording papers (papers designed exclusively for inkjet recording) having an ink-absorbing layer brought some improvements, but the ink printed on plain paper hardly has sufficient resistance to water yet.

On the other hand, pigments are superior in light resistance and water resistance compared with dyes, and use of a pigment as a colorant for inkjet-recording ink composition has been studied recently for improvement in light resistance and water resistance. Because pigments are generally insoluble in water, in order to use a pigment in a water-based ink composition, it is necessary to prepare the ink composition after mixing a pigment in a dispersant, such as a water-soluble resin, and stably dispersing the pigment in water.

It is necessary to study the kind and particle diameter of pigment, the kind of resin to be used, the dispersion means, and the like, to disperse the pigment stably in a water-based system, and there have been many dispersion methods and inkjet-recording inks studied.

For example, JP-A-8-3498 ("JP-A" means unexamined published Japanese patent application) describes use of a surface-modified carbon black in an ink, which carbon black is prepared by oxidation of an acidic carbon black with a hypohalogenous acid, and the thus-obtained pigment can be dispersed independently as it is. Alternatively, JP-A-10-120958 describes use, in an ink, of a surface-modified carbon black, prepared by oxidation of a carbon black, having a primary particle diameter of 40 nm or less and having a DBP (dibutyl phthalate) oil-adsorption amount of 60 mL/100 g, with a hypohalogenous acid. Use of such a surface-modified carbon black pigment described in these references, which is dispersible freely and independently, in an inkjet-recording ink is advantageous in obtaining a print with high color density on plain paper. However, it is necessary to take measures, for example, to increase the pigment concentration in ink, in order to achieve higher color density. Increasing the pigment concentration often makes it difficult to prepare stable ink with sufficient fluidity for use as an inkjet-recording ink. Alternatively, JP-A-2004-149765 discloses use, in inkjet ink, of a colorant, such as metal particles or alloy particles, enclosed in a dendrimer resin, to impart dispersibility of colorant, storage stability, particle-diameter uniformity, ink-ejection efficiency, and other properties. However, the method still had the problem that it gave an image having metallic gloss, leading to a sense of incompatibility, when a solid image was printed at high optical density.

DISCLOSURE OF INVENTION

The present invention has been completed based on the finding that it was possible to overcome the problems above by using metal particles having a silver tin alloy region, as colorants.

The present invention provides the following means:

(1) A black ink composition, comprising metal particles having a silver tin alloy region as its colorant.

(2) The black ink composition described in (1), wherein the content of silver atoms in the metal particles is 30 to 80 mol %.

(3) The black ink composition described in (1) or (2), wherein the metal particles are dispersed with a dispersant.

(4) The black ink composition described in any one of (1) to (3), for use as an inkjet ink.

(5) An inkjet-recording method of recording an image by ejecting droplets of an ink composition and depositing the droplets on a recording medium, comprising using the black ink composition described in any one of (1) to (4) as a black ink composition.

(6) A recorded material, formed by using the black ink composition described in any one of (1) to (4) or by using the inkjet-recording method described in (5).

(7) A black dispersion, comprising metal particles having a silver tin alloy region.

The present invention provides a black ink composition that gives a print higher in optical density without increase in the content of the colorant and prevents problems, such as clogging in the ejection nozzle head, for use in inkjet-recording process.

The present invention also provides a black ink composition that is suppressed in showing a metallic glossy appearance even in a solid printing.

The black ink composition according to the present invention is higher in optical density; it does not have metallic gloss, and is superior in clogging resistance. In addition, the inkjet-recording method according to the present invention gives a print superior in printing quality. The recorded material according to the present invention is superior in printing property. The black ink composition according to the present invention can be used favorably in page printers, color printers (multiple- or full-color), or high-speed page printers employing a line head, because it is superior in printing property, and clogging resistance at a high concentration.

Other and further features and advantages of the invention will appear more fully from the following description.

BEST MODE FOR CARRYING OUT INVENTION

In the present specification, the term "printing" means text printing, image printing, and printing of other things, such as printing of a circuit.

The black ink composition according to the present invention (hereinafter also simply referred to as "the ink composition according to the present invention") at least contains metal particles having a silver tin alloy region as its colorant, and may additionally contain other components according to purpose and application as needed. These components will be described specifically below.

<Metal Particles Having a Silver Tin Alloy Region>

The black ink composition according to the present invention contains metal particles having a silver tin alloy region. The particles for use in the present invention preferably make the ink composition exhibit high black density even when present in a small amount.

In the metal particles having a silver tin alloy region according to the present invention, each particle is made of a silver tin alloy, of a silver tin alloy region and another metal region, or of a silver tin alloy and another alloy region.

The definition of "metal" in the present invention is the same as that described in Dictionary of Science and Chemistry, 4th Ed., (1987, Iwanami Shoten), and the silver tin alloy according to the present invention is a mixture of silver and tin at the atomic level, and examples thereof include solid solution, eutectic crystal, compound, intermetallic compound, and the like. The definition of "alloy" is the same as that described, for example, in Dictionary of Science and Chemistry 4th Ed., (1987, Iwanami Shoten).

The fact that at least a part of the metal particle is made of a silver tin alloy can be confirmed, for example, by spectral measurement of the particle in the central 15-nm square area, at an accelerating voltage of 200 kV, using a HD-2300 manufactured by Hitachi Ltd. and an EDS (energy diversive X-ray analyzer) manufactured by Noran.

The method of preparing the metal particles having a silver tin alloy region according to the present invention is not particularly limited. For example, the particles may be prepared by a common method: a method of melting and mixing ingredients, for example, in a crucible under heat, but such a method demands an additional step of forming fine particles therefrom; and thus, preferable is a particle reduction method. This method comprises mixing two or more metal compounds and reducing them. If the reduction properties of the metals to be used are different, it is preferable to convert one of the metals into a complex salt as needed, and thus control the precipitation timing thereof. The reduction is performed preferably in solution, and in such a case, the solvent may be water or an organic solvent.

For example, in the case of particles of a silver/tin alloy or of a mixture of silver and a silver/tin alloy, it is preferable to use the following compounds.

Favorable examples of the silver compounds include silver nitrate ($AgNO_3$), silver acetate ($Ag(CH_3COO)$), silver perchlorate ($AgClO_4.H_2O$), and the like. Among them, silver acetate is particularly preferable.

Favorable examples of the tin compounds include stannous chloride ($SnCl_2$), stannic chloride ($SnCl_4$), stannous acetate ($Ag(CH_3COO)_2$), and the like. Among them, stannous acetate is particularly preferable.

The reduction may be performed favorably, for example, by a method of using a reducing agent, a method of effecting reduction by electrolysis, or the like. Among them, the former, a method of using a reducing agent, is preferable, because it gives fine particles. Examples of the reducing agents include hydroquinone, catechol, para-aminophenol, para-phenylenediamine, hydroxyacetone, and the like. Among them, hydroxyacetone is particularly preferable, because it is volatile and less likely to exert adverse effects on display devices.

For example, when silver acetate and stannous acetate are used and hydroxyacetone is used as a reducing agent, the temperature in preparing the alloy is preferably 15 to 50° C., and the period of preparation is preferably 10 to 200 minutes.

The metal particles having a silver tin alloy region according to the present invention are preferably particles having the physical properties, particle size, particle shape, and others as described below.

The content of silver atom in the metal particles having a silver tin alloy region according to the present invention is preferably 30 to 80 mol % from the viewpoint of achieving both the decreased metallic gloss and the high optical density of the particle; and the silver content is more preferably 30 to 73 mol %.

The molar ratio of metal elements, silver/tin, in the silver tin alloy region of the metal particles having a silver tin alloy region according to the present invention is preferably in the range of 1/99 to 99/1, more preferably 5/95 to 95/5, and still more preferably 10/90 to 90/10. A ratio outside the range of 1/99 to 99/1 can lead to problems, such as reddening of black tone and increase in reflectance by heating.

In addition, the molar ratio of metal to silver tin alloy, of alloy to silver tin alloy is also preferably in the range of 1/99 to 99/1, more preferably 5/95 to 95/5, and still more preferably 10/90 to 90/10. A ratio outside the range of 1/99 to 99/1 can also lead to problems, such as reddening of black tone and increase in reflectance by heating. The silver tin alloy region and the metal region can be physically differentiated by elemental mapping by using the aforementioned EDS.

The average particle diameter of the metal particles having a silver tin alloy region according to the present invention is preferably 10 to 700 nm, more preferably 12 to 200 nm, and particularly preferably 15 to 100 nm, in terms of number-average particle size (diameter). A too large number-average particle size can lead to deterioration in surface state (planarity) of the formed film, and a too small number-average particle size can lead to less blackness, resulting in a tinge of yellow. The number-average particle size is determined, for example, by using a micrograph obtained with a transmission electron microscope JEM-2010 (manufactured by JEOL Ltd.) according to the following manner: a hundred particles are selected; the diameter of a circle having an area identical with that of individual particle is determined as the diameter of the particle; and the average of the diameters of the 100 particles is regarded as the number-average particle size. The micrograph is taken at a magnification of 100,000 times and an accelerating voltage of 200 kV.

The particle shape of the metal particle having a silver tin alloy region according to the present invention is not particularly limited, and may be any shape: undefined, spherical, cubic, acicular (needle-shape), or the like.

The metal particles according to the present invention may contain a salt, an organic substance, other elements (Ca, P, Na, etc.), or the like, in addition to the metal elements constituting the alloy.

In the ink composition according to the present invention, two or more kinds of metal particles having a silver tin alloy region may be used as a mixture as needed, and one or more kinds of the metal particles having a silver tin alloy region may be used as a mixture with other metal fine particles or alloy fine particles. In preparation of the composite particles of a metal and a silver tin alloy or of an alloy and a silver tin alloy, a small amount of metal or alloy fine particles can be generated as by-products, but the mixture can be used without removing the by-products.

The metal particles having a silver tin alloy region according to the present invention is preferably dispersed in a dispersant, and then added to the ink composition. Any one of known dispersants commonly used for dispersing pigment may be used as the dispersant. Favorable examples of the dispersants include thiol-group-containing compounds, polyethyleneoxide-group-containing compounds, amino acids or derivatives thereof, peptide compounds, polysaccharides and natural polymers derived therefrom, synthetic polymers such as polyvinylpyrrolidone and vinylpyrrolidone/vinyl acetate copolymers and gels derived therefrom, and the like. The dispersant is preferably a compound having a sulfur or nitrogen atom.

In the present invention, the content of the metal particles having a silver tin alloy region that are used as a colorant in a black ink composition is preferably 0.5 to 30 vol %, more preferably 1 to 20 vol %, in the ink composition. An excessively smaller content is unfavorable because it leads to insufficient optical density, while an excessively larger content is unfavorable because it increases a tendency to cause troubles such as clogging and prevents production of inks higher in ejection stability. When a dispersant is used, the content thereof in the black ink composition is preferably 0.0005 to 30 vol % and more preferably 0.001 to 20 vol %.

As to materials and physical property settings that can be applied to the ink composition according to the present invention, in addition to the aforementioned metal particles having a silver tin alloy region and the dispersant, known raw materials and physical property settings can be applied. For example, the raw materials and the physical properties described in JP-A-2004-115702, JP-A-2004-123804, JP-A-2004-123828, JP-A-2000-318293, JP-A-2002-375383, JP-A-9-176532 and JP-A-11-349876, and others are applicable.

<Solvent>

The ink composition according to the present invention may or may not contain a solvent. When no solvent is used, the metal particle according to the present invention may be dispersed in a liquid substance such as a monomer. Examples of the solvents that can be used include water and organic solvents including oil-soluble organic solvents and water-soluble organic solvents.

<Water-Soluble Organic Solvent>

Examples of the water-soluble organic solvents for use in the present invention include moisturizers, penetrative solvents, surfactants, and the like.

<Moisturizer>

The moisturizer may be added to suppress ink drying. It is added to reduce the water vaporization due to drying at the nozzle tip and thereby preventing aggregation and solidification of the ink.

The moisturizer is selected from highly-hygroscopic water-soluble compounds, and typical examples thereof for use include polyols such as glycerol, ethylene glycol, diethylene glycol, triethylene glycol, tetraethylene glycol, polyethylene glycol, propylene glycol, dipropylene glycol, polypropylene glycol, 1,3-propanediol, 1,4-butanediol, 1,5-pentanediol, 1,2,6-hexanetriol, and pentaerythritol; lactams such as 2-pyrrolidone and N-methyl-2-pyrrolidone; ureas such as 1,3-dimethylimidazolidinones; and the like.

In addition, a water-soluble solid moisturizer may be used in combination with the moisturizing organic solvent described above, for the purpose of aiding moisturizing potential of the moisturizing organic solvent.

Examples thereof include diols such as 1,6-hexanediol and 1,8-octanediol; polyols such as trimethylolethane and trimethylolpropane; lactams such as ε-caprolactam; urea derivatives such as urea, thiourea, and ethyleneurea; sugars such as monosaccharides, disaccharides, oligosaccharides, and polysaccharides and derivatives of these sugars, for example, reducing sugars, oxidized sugars, amino sugars, thiosugars (e.g. glucose, mannose, fructose, ribose, xylose, arabinose, galactose, aldonic acid, glucitol (sorbit), maltose, cellobiose, lactose, sucrose, trehalose, and maltotriose); and the like. Sugar alcohols are particularly preferable, and typical examples thereof include maltitol, sorbit, and the like.

The content of moisturizer, when used singly or as a mixture of two or more moisturizers, is preferably 1 to 40 mass %, more preferably 1 to 30 mass %, in the ink. These moisturizers may be added, together with other ink additives, in an amount that gives the ink viscosity of 25 cPs or less at 25° C.

<Penetrative Solvent>

The penetrative solvent is an additive for increasing ink penetration into recording mediums, and selected properly according to the desirable ink-drying time.

An example of the penetrant is preferably a low-boiling point water-soluble organic solvent; examples thereof include methanol, ethanol, n-propyl alcohol, iso-propyl alcohol, n-butanol, sec-butanol, tert-butanol, iso-butanol, n-pentanol, and the like; and monovalent alcohols are particularly preferable. The content of the low-boiling point water-soluble organic solvent is preferably in the range of 0.5 to 10 mass % with respect to the ink composition.

Alternatively, the penetrant may be selected from water-soluble organic solvents effective in reducing the surface tension of aqueous solutions, such as 1,2-alkyldiols and glycol monoether derivatives of polyvalent alcohols, so as to make the ink surface tension in the range of 15 to 40 mN/m.

As the 1,2-alkyldiols, 1,2-alkyldiols having 4 to 8 carbon atoms, such as butanediol, pentanediol, hexanediol, heptanediol, and octanediol are preferable. 1,2-alkyldiols having 6 to 8 carbon atoms, such as 1,2-hexanediol, 1,2-heptanediol, and 1,2-octanediol are particularly preferable, as they are higher in penetrability into recording papers. In addition, the 1,2-alkyldiol is preferably added in an amount in the range of 0.25 to 5 mass % in the ink composition.

As the glycol monoether derivatives of polyvalent alcohols, derivatives of polyvalent alcohols having 3 or more carbon atoms at the alkyl part thereof are preferable. Typical examples include ethylene glycol monobutylether, diethylene glycol mono-n-propylether, ethylene glycol mono-iso-propylether, diethylene glycol mono-iso-propylether, ethylene glycol mono-n-butylether, ethylene glycol mono-t-butylether, diethylene glycol mono-n-butylether, triethylene glycol mono-n-butylether, diethylene glycol mono-t-butylether, 1-methyl-1-methoxybutanol, propylene glycol mono-t-butylether, propylene glycol mono-n-propylether, propylene glycol mono-iso-propylether, propylene glycol mono-n-butylether, dipropylene glycol mono-n-butylether, dipropylene glycol mono-n-propylether, dipropylene glycol mono-iso-propylether, and the like. The content of the glycol monoether derivative of polyvalent alcohol is preferably in the range of 0.5 to 15 mass % in the ink composition.

These penetrants may be used alone or in combination of two or more as a mixture. Combined use of multiple compounds different in structure is particularly preferable from the viewpoint of compatibility with various kinds of papers, because it allows printing of an image similar in quality on various kinds of paper different in absorption efficiency and color-developing property.

When preparing an ink having a surface tension of more than 40 mN/m and a relatively long drying time, a moisturizer that can decrease the surface tension of aqueous solutions to a relatively small value may be used as replacement for the penetrant, and in such a case, an ink may be prepared without use of the penetrant described above.

<Surfactant>

A surfactant may be used alone or in combination with the aforementioned penetrative solvent, to reduce the surface tension of ink to 15 to 45 mN/m and to increase the ink permeability into recording media. Favorable examples of the surfactant include fatty acid salts, anionic surfactants, such as alkyl sulfate ester salts; nonionic surfactants, such as polyoxyethylene alkylethers and polyoxyethylene phenylethers; acetylene glycol-based nonionic surfactants, cationic surfactants, ampholytic surfactants, silicon-based surfactants, phosphorus-based surfactants, boron-based surfactants, and the like.

Examples of the silicon-based surfactant include BYK-307, BYK-331, BYK-333, and BYK-348 (trade names, manufactured by BYK-Chemie), and the like.

In the present invention, acetylene glycol-based surfactants are particularly preferable, as they are not or less foaming. Typical examples of the acetylene glycol compounds favorable in the present invention include Surfynol 61, 82, 104, 440, 465, 485, and TG (trade names), manufactured by Air Products and Chemicals Inc., Olfine STG and Olfine E1010 (trade names) manufactured by Nisshin Chemical Industry Co., Ltd., and the like. The content of the acetylene glycol compound may be decided arbitrarily according to the desirable ink drying time, but is preferably 0.01 to 5 mass % in the ink composition.

The surfactant may be used alone as the penetrant, but combined use of a surfactant and a penetrative solvent described above is particularly preferable, because such a combined use results in preferable effects such as reduction of the total amount of penetrant to be used and reduction of foaming of surfactant.

<Water>

Water is the principal medium when the ink composition according to the present invention is an aqueous ink composition, and pure water, such as ion-exchange water, ultrafiltration water, reverse osmosis water, distilled water, or ultrapure water, may be used as the water suitable for the present invention, for the purpose of reducing the amount of ionic impurities as much as possible. Alternatively, use of water sterilized by UV irradiation or hydrogen peroxide addition is also favorable for prevention of proliferation of fungi and bacteria when the ink composition is to be stored for an extended period of time. The content of water is preferably 20 to 80 mass % and more preferably, 30 to 70 mass %.

<Other Components>

The aqueous ink according to the present invention may contain the aforementioned components, but may further contain, as needed, other additives commonly used in ink compositions for inkjet-recording method. Examples of the additives added as needed include antioxidant/ultraviolet absorbents, antiseptic/mildew proofing agents, and the like.

Examples of the antioxidant/ultraviolet absorbent that can be used include alohanates, such as alohanate and methyl alohanate; biurets, such as biuret, dimethylbiuret, and tetramethylbiuret; L-ascorbic acid and the salts thereof; Tinuvin 328, 900, 1130, 384, 292, 123, 144, 622, 770, and 292, Irgacor 252 and 153, Irganox 1010, 1076, and 1035, and MD 1024 (trade names) manufactured by Ciba-Geigy Corp.; lanthanide oxides, and the like.

Examples of the antiseptic/mildew proofing agents include sodium benzoate, pentachlorophenol sodium, 2-pyridinthiol-1-oxide sodium, sodium sorbate, sodium dehydroacetate, 1,2-dibenzisothiazolin-3-one, and the like.

The inkjet-recording method according to the present invention is not particularly limited, as long as it is a method of ejecting droplets of the black ink composition described above through a micro nozzle and depositing the droplets on a recording medium. Typical examples thereof are the followings:

Firstly, an electrostatic attraction method of applying a strong electric field between a nozzle and an acceleration electrode placed in front of the nozzle, ejecting droplets of ink from the nozzle continuously, and recording an image by providing deflection electrodes with printing information signal, during flight of the ink droplets, or ejecting ink droplets according to the printing information signal, without deflection of the ink droplets;

Secondly, a method of applying pressure on the ink solution by a small pump and ejecting ink droplets forcibly by mechanically vibrating the nozzle with, for example, a quartz oscillator, wherein the ejected ink droplets are charged at the same time of ejection and an image is recorded by providing deflection electrodes with printing information signal, during flight of the ink droplets;

Thirdly, a method of using a piezoelectric device, wherein ink droplets are ejected to conduct recording by applying, to the ink solution, pressure and printing information signal with the piezoelectric device; and Fourthly, a method of rapidly increasing the volume of the ink solution by applying thermal energy, wherein ink droplets are ejected to conduct recording by allowing the ink solution to foam according to the printing information signal by heating with a microelectrode.

Among the aforementioned various inkjet-recording processes, a combination of a printing method at a relatively slow ink-ejection speed of 10 m/s or less and the ink composition according to the present invention is particularly preferable, because it prevents deposition of the ink on the ejection nozzle and allows consistent ink-jet recording.

Examples of the recorded material formed with the aforementioned black ink composition or by the aforementioned inkjet-recording method include prints on woodfree paper, coated paper, or the like, photographs printed on glossy paper, display-device black matrixes printed on a transparent base material, and the like.

The present invention will be described in more detail based on the following examples, but the invention is not intended to be limited thereto.

EXAMPLES

In the following Examples, "part" and "%" are expresses by mass, unless specified otherwise.

Example 1

Preparation of Dispersions

<Preparation of AgSn alloy particle dispersion (Dispersion A1)>

23.1 g of silver (I) acetate, 65.1 g of tin acetate (II), 54 g of gluconic acid, 45 g of sodium pyrophosphate, 2 g of polyethylene glycol (molecular weight: 3,000), and 5 g of E735 (trade name; vinylpyrrolidone/vinyl acetate copolymer; manufactured by ISP) were dissolved in 1,000 ml of pure water, to give Solution 1.

Separately, 36.1 g of hydroxyacetone was dissolved in 500 ml of pure water, to give Solution 2.

While keeping the above Solution 1 at 25° C. with vigorously stirring, the above Solution 2 was added to Solution 1 over two minutes, and then the mixture was stirred gently for additional 6 hours. The mixture turned black in color, generating silver tin (AgSn) alloy fine particles. Then the solution was subjected to centrifugation, to precipitate the AgSn alloy fine particles. In the centrifugation process, the mixture was divided into 150-ml fractions, and these were centrifuged in a tabletop centrifugal separator H-103n (manufactured by Kokusan Co., Ltd.) at a rotational frequency of 2,000 r.p.m. for 30 minutes. Then, the supernatant liquid was discarded so that the amount would be 150 ml in total; 1,350 ml of pure water was added thereto; and the mixture was stirred for 15 minutes, allowing the AgSn alloy fine particles to be redispersed. The operation was repeated twice, for removal of soluble substances in the aqueous phase.

Then, the solution was centrifuged additionally, allowing the fine particles to be reprecipitated. Centrifugation was performed under the same conditions to the above. After centrifugation, the supernatant liquid was discarded similarly to the above to make the solution 150 ml in total; 850 ml of pure water and 500 ml of acetone were added thereto; and the mixture was stirred for 5 minutes, allowing the fine particles to be redispersed.

Centrifugation was again performed in the same manner as the above, to precipitate the AgSn alloy fine particles. Then the supernatant liquid was discarded to make the solution 150 ml in total; 150 ml of pure water and 1,200 ml of acetone were added thereto; and the mixture was stirred additionally for 15 minutes, allowing the AgSn alloy fine particles to be redispersed. The dispersion was centrifuged again. The conditions for centrifugation then were the same as those in the above, except that the period was elongated to 90 minutes. The supernatant liquid was then discarded to make the solution 70 ml in total, to which 30 ml of acetone was added. The resultant was dispersed in an Eiger mill (Eiger mill M-50 (medium: 130 g of zirconia beads having a diameter of 0.65 mm), manufactured by Japan Eiger) for 6 hours, to give a silver tin (AgSn) alloy fine particle dispersion. By X-ray scattering, it was confirmed that the fine particles were consisted of AgSn alloy)($2\theta=39.5°$) and Sn metal ($2\theta=30.5°$). The numbers in parenthesis are respectively the scattering angles of the (III) faces of the AgSn alloy and Sn metal.

The number-average particle size of the fine particles was determined from a micrograph obtained with a transmission electron microscope JEM-2010 (manufactured by JEOL Ltd.) according to the following method:

A hundred particles were selected; the diameter of a circle having an area identical with that of individual particle was assumed as the diameter of the particle; and the average of the diameters of the 100 particles was regarded as the number-average particle size. The micrograph was taken at a magnification of 100,000 times and an accelerating voltage of 200 kV. The average particle diameter of the fine particles thus obtained was approximately 25 nm in terms of number-average particle size.

The composition of the fine particles was determined by spectral measurement of the individual particle in the central 15 nm square area, at an accelerating voltage of 200 kV, by using HD-2300 manufactured by Hitachi Ltd. and an EDS (energy diversive X-ray analyzer) manufactured by Noran. As a result, the composite particle was shown to have 77% of alloy region with a silver/tin molar ratio of approximately 3/1, and 23% of pure-tin region. There were also observed small amounts of pure-silver fine particles, pure-tin fine particles, and alloy fine particles with a silver/tin molar ratio of approximately 3/1.

40 g of the thus-obtained Dispersion A1, 10 g of glycerol, 2 g of triethylene glycol, 3 g of 2-pyrrolidone, and 4 g of triethylene glycol monobutylether were mixed; 1 g of Surfynol 465 (trade name; acetylene glycol-based surfactant; manufactured by Air Products and Chemicals Inc.) and ultrapure water were added thereto to make a total amount of 100 g; and the mixture was stirred for two hours and then filtered through a Membrane Filter (trade name, manufactured by Nihon Millipore Ltd.) having a pore size of approximately 1.2 μm, to give a black ink composition.

A solid image of a size of 10 cm×10 cm was printed on one face of a double-faced woodfree plain paper (trade name, manufactured by Fuji Xerox Co., Ltd.) using the black ink composition with a piezoelectric device-type inkjet printer EM930 (trade name, manufactured by Seiko Epson Corp.).

Example 2

A black ink composition was prepared in the same manner as in Example 1, except that a dispersion (Dispersion A2), which was prepared by changing the amounts of the silver (I) acetate and tin (II) acetate used in preparation of Dispersion A 1 in Example 1 to 58.8 g and 19.8 g, respectively, was used. A print was made in the same manner as in Example 1.

The average dispersed particle diameter in Dispersion A2 was approximately 25 nm in terms of number-average particle size. The fine particles in Dispersion A2 were composite particles having 95% of alloy region with a silver/tin molar ratio of approximately 3/1, and 5% of pure-tin region. There were also observed small amounts of silver particles, tin particles, and silver/tin alloy particles.

Comparative Example 1

15.0 g of carbon black, 15.0 g of dispersion resin (Johncryl J-61J (trade name), resin component: 30.5%, Johnson Polymer Co., Ltd.) and 70.0 g of ion-exchange water were premixed, and the mixed solution was then dispersed for two hours in a sand grinder mill as a dispersing machine, by using ϕ1.0-mm zirconia beads as dispersion media. After the completion of the dispersion step, the zirconia beads were separated, to give Pigment dispersion B1.

A black ink composition was prepared in the same manner as in Example 1, except that Dispersion A 1 of Example 1 was replaced with the above Dispersion B1. A print was made in the same manner as in Example 1.

Comparative Example 2

19.8 g of silver fine particles having an average aspect ratio of 2.2 and 1.05 g of polyvinylpyrrolidone (PVP-K15 (trade name), manufactured by ISP Japan) were mixed with 79.15 g of pure water. The mixture was dispersed with an ultrasonic dispersing machine (Ultrasonic Generator Model US-6000 ccvp (trade name), manufactured by Nissei Corporation), to give Dispersion B2 containing silver fine particles having a circle-equivalent diameter of 100 nm.

A black ink composition was prepared in the same manner as in Example 1, except that Dispersion A 1 in Example 1 was replaced with the above Dispersion B2. A print was made in the same manner as in Example 1.

Each of the black ink compositions obtained in Examples and Comparative Examples (hereinafter, referred to simply as "inks") was evaluated according to the following evaluation methods, and the results are summarized in Table 1.
Evaluation Method
<Optical Density>

The optical density of a 100%-black solid region was determined. The optical density was determined using a X-Rite 939 (trade name, manufactured by X-Rite).
<Gloss>

The metallic gloss of a 100%-black solid region in the print obtained in each of the Examples and Comparative Examples was evaluated by visual observation.

○: No metallic gloss

Δ: Slight gloss but without problem
x: Gloss of characteristic of metals, giving a sense of incompatibility <Ink Clogging>

Ink clogging in the aforementioned inkjet printer was evaluated.

◯: No clogging (stable ink ejection in continuous operation of one hour or more)

x: Clogging (unstable ink ejection within one hour of continuous operation)<

<Overall Evaluation>

Each recorded material was evaluated according to the following criterion for judging.

◯: High color-developing property and free of metallic gloss and ink clogging.

x: Unfavorable either in color-developing property, metallic gloss, or ink clogging.

TABLE 1

|  | Example 1 | Example 2 | Comparative example 1 | Comparative example 2 |
|---|---|---|---|---|
| Optical density | 1.32 | 1.31 | 1.18 | 1.32 |
| Metallic gloss | ◯ | Δ | ◯ | X |
| Ink clogging | ◯ | ◯ | X | ◯ |
| Overall rating | ◯ | ◯ | X | X |

As shown in Table 1, the ink of Comparative Example 1, using carbon black, was lower in optical density. The ink of Comparative Example 2, using silver particles, was higher in optical density, but had metallic gloss. In contrast, the inks of Examples 1 and 2 kept high optical density even when the pigment volume concentration was the same, and gave an image without gloss characteristic to metal, and were superior in clogging resistance and printing quality.

INDUSTRIAL APPLICABILITY

The black ink composition according to the present invention can be used favorably in page printers, color printers (multiple- or full-color), or high-speed page printers employing a line head.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A black ink composition, comprising metal particles having a silver tin alloy region as its colorant, wherein individual ones of said metal particles consist of a silver tin alloy, or consist of a silver tin alloy region and another metal region, or consist of a silver tin alloy region and another alloy region, and wherein said metal particles are black metal particles.

2. The black ink composition as claimed in claim 1, wherein the content of silver atoms in the metal particles is 30 to 80 mol %.

3. The black ink composition as claimed in claim 1, wherein the average particle diameter of the metal particles having a silver tin alloy region is 10 to 700 nm in terms of number average particle size.

4. The black ink composition as claimed in claim 1, wherein the content of the metal particles having a silver tin alloy region in the black ink composition is 0.5 to 30 vol %.

5. The black ink composition as claimed in claim 1, wherein the metal particles are dispersed with a dispersant.

6. The black ink composition as claimed in claim 1, for use as an inkjet ink.

7. An inkjet-recording method of recording an image by ejecting droplets of an ink composition and depositing the droplets on a recording medium, comprising using the black ink composition as claimed in claim 1 as a black ink composition.

8. A black dispersion, comprising metal particles having a silver tin alloy region, wherein individual ones of said metal particles consist of a silver tin alloy, or consist of a silver tin alloy region and another metal region, or consist of a silver tin alloy region and another alloy region, and wherein said metal particles are black metal particles.

9. The black ink composition as claimed in claim 1, wherein said metal particles are spherical, cubic or acicular in shape.

10. The black ink composition as claimed in claim 1, wherein said metal particles exhibit suppressed metallic gloss.

11. The black ink composition as claimed in claim 1, wherein no metallic gloss is visually observed when the black ink composition is printed as a solid region on a wood-free plain paper using an inkjet printer.

12. The black dispersion as claimed in claim 8, wherein said metal particles are spherical, cubic or acicular in shape.

13. The black dispersion as claimed in claim 8, wherein said metal particles exhibit suppressed metallic gloss.

14. The black dispersion as claimed in claim 8, wherein no metallic gloss is visually observed when a black ink composition comprising said black dispersion is printed as a solid region on a wood-free plain paper using an inkjet printer.

* * * * *